United States Patent [19]

Hirata

[11] Patent Number: 4,550,281
[45] Date of Patent: Oct. 29, 1985

[54] SYNCHRONOUS MOTOR CONTROL

[75] Inventor: Akio Hirata, Tokyo, Japan

[73] Assignee: Tokyo Shibaura Denki Kabushiki Kaisha, Kawasaki, Japan

[21] Appl. No.: 528,432

[22] Filed: Sep. 1, 1983

[30] Foreign Application Priority Data

Sep. 25, 1982 [JP] Japan ................................ 57-166014

[51] Int. Cl.$^4$ ............................................. H02P 5/40
[52] U.S. Cl. .................................... 318/723; 318/721
[58] Field of Search ................ 318/729, 722, 756, 721

[56] References Cited

U.S. PATENT DOCUMENTS 3,427,526  2/1969  Kernick ............................. 318/778
3,967,173  6/1976  Stich .
4,047,083  9/1977  Plunkett ............................ 318/807
4,085,355  4/1978  Fradella ............................. 318/721
4,088,932  5/1978  Okuyama et al. .................. 318/721
4,296,367  10/1981 Hirata .

Primary Examiner—David Smith, Jr.
Attorney, Agent, or Firm—Cushman, Darby & Cushman

[57] ABSTRACT

Apparatus and method for controlling a synchronous motor driving a square-law torque load at variable speeds by employing a frequency changer. The armature voltage Va may be controlled so that the ratio Va/N at motor speeds above a predetermined value is greater than Va(100)/N(100), where N(100) is the rated speed of the motor and Va(100) is the armature voltage at that speed. Below a predetermined speed, the armature voltage may be controlled so that the ratio Va/N is less than Va(100)/N(100).

20 Claims, 12 Drawing Figures

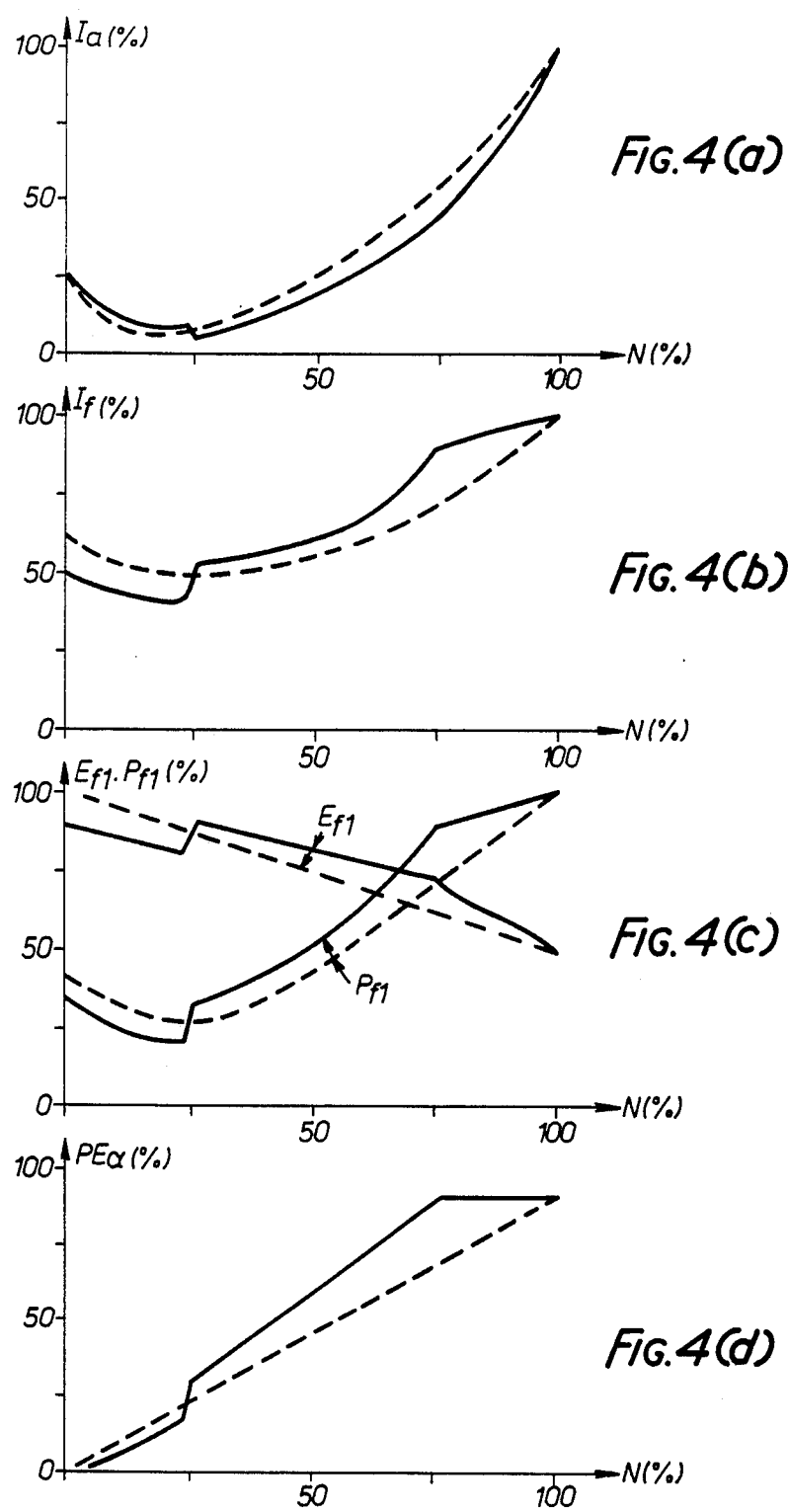

SYNCHRONOUS MOTOR CONTROL

BACKGROUND OF THE INVENTION

This invention relates to controlling a synchronous motor driving a square-law torque load, particularly when operated at variable speeds by a frequency changer.

Technological progress in recent years has led to the use of many methods of variable-speed operation of synchronous motors, including those methods which make use of a forced commutation frequency changer and those which employ a natural commutation (load commutation) frequency changer. The range of application for such methods has also expanded year by year from small and medium motors to large motors. Although the types of loads driven by these synchronous motors are also numerous, they can be divided into two general types: constant torque loads where a roughly constant torque is required irrespective of the motor speed N, and square torque loads where the torque required varies in proportion to the square of the speed N such as with fans, blowers or pumps.

FIG. 1 is a graph of the characteristics of a conventional drive control system for a synchronous motor. The armature voltage Va of the synchronous motor and the load torque T are plotted on vertical axes, while the speed N of the synchronous motor is plotted on the horizontal axis. As the graph shows, it was usual, in conventional synchronous motors, for the Va (armature voltage)/N (rpm) ratio to be controlled to a constant value when the load torque exhibits squared characteristics.

The conventional drive control system for a synchronous motor driving a square-law torque load gives rise to the following problems:

(1) In general, with a square-law torque load, the power required is proportional to $N^3$, and the system is therefore usually operated with the rpm of the synchronous motor set at less than 100% of the rated figure, with relatively long periods of operation at 50 to 80% of the rating. In this typical operating range, the power factor $PF\alpha$ at the input to the control circuit is low, and a large amount of reactive current is taken into the control circuit from the input AC source.

(2) Since the excitation input voltage $EF_1$ of the magnetic field input source is at its maximum when the speed N of the synchronous motor is 0, the capacity of the field input source is required to be large and the power factor of the current drawn from this supply source is poor.

SUMMARY OF THE INVENTION

The invention was devised in order to overcome the drawbacks of the conventional synchronous motor drive control system.

Accordingly, an object of the invention is to provide a new and improved synchronous motor control system.

Another object of the invention is to provide a synchronous motor control system in which the reactive current drawn from and capacity of the input AC source can be reduced.

A further object of the invention is to provide a synchronous motor control system in which the capacity of the field input source is reduced and its power factor is improved.

In order to achieve these objects, the synchronous motor control method and apparatus of this invention controls the armature voltage Va so that the ratio Va/N in the range above a predetermined rotational speed N of the motor is greater than the ratio Va(100)/N(100) at the rated rotational speed N of the motor, or it controls the armature voltage so that, in the range below a predetermined rotational speed N of the motor, Va/N is smaller than Va(100)/N(100).

BRIEF DESCRIPTION OF THE DRAWINGS

These and other objects and advantages of the invention will be more readily apparent from the following detailed description when considered in conjunction with the accompanying drawings, wherein:

FIGS. 4(a)–4(d) are graphs of the characteristics of the synchronous motor drive control system of the invention;

DETAILED DESCRIPTION OF THE INVENTION

Figure 2:
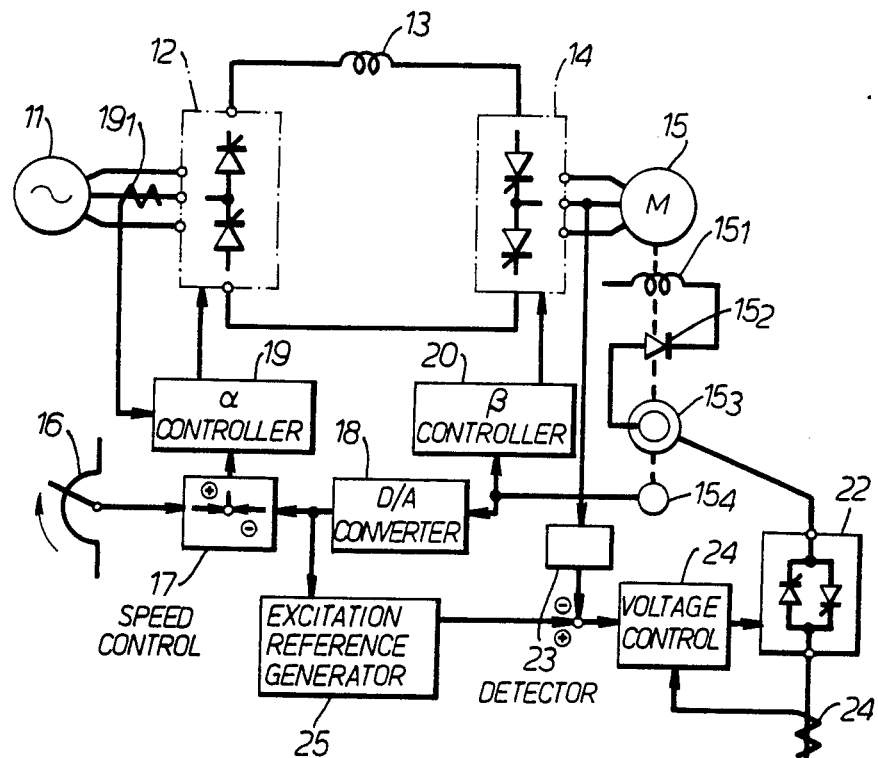
FIG. 2 is a schematic diagram showing an embodiment of the invention.

Referring to the schematic block diagram of FIG. 2, 11 in this drawing is an input AC source, 12 a rectifier, 13 a DC reactor, 14 an inverter, 15 the synchronous motor, $15_1$ the field winding of the synchronous motor 15, $15_2$ a rotor rectifier, $15_3$ an induction frequency changer (rotating AC transformer), $15_4$ a sensor, 16 a speed reference input control, 17 a speed controller, 18 a D/A converter, 19 an $\alpha$ controller, $19_1$ a current detector, 20 a $\beta$ controller, 21 a magnetic field current input source, 22 a thyristor switch, 23 a voltage detector, 24 a voltage controller, $24_1$ a current detector, and 25 an excitation reference generator.

The AC power from input AC source 11 is converted to DC by rectifier 12. The rectified energy is then smoothed by DC reactor 13, inverted to AC of a different frequency by inverter 14, and applied to synchronous motor 15 to drive it at variable speeds. The frequency of the AC power applied to synchronous motor 15 is determined by speed reference input control 16 as follows. The rotation of synchronous motor 15 is detected by sensor $15_4$. The detection signal is converted by D/A converter 18 into an analog signal which is compared by the speed controller 17 with the speed reference from speed reference input control 16. The result of the comparison is employed by $\alpha$ controller 19 to control the power output of rectifier 12. $\alpha$ controller 19 also detects the input current to rectifier 12. Thus the power fed to synchronous motor 15 is variably controlled so that the speed of motor 15 approaches the desired value N. Inverter 14 is controlled via $\beta$ controller 20 by the signal from the sensor $15_4$, which detects the angular position of the rotating magnetic field of synchronous motor 15. The point at which the inverter undergoes load commutation (natural commutation), due to the counter electromotive force of synchronous motor 15, is detected using the signal from sensor $15_4$ and taken by β controller 20 as the reference to determine the timing of the inverter turn-on. As for the magnetic flux of synchronous motor 15, the AC power of field input source 21 is voltage-controlled by thyristor switch 22, the output of which is applied to induction frequency changer 15₃. The AC power output at the secondary side of induction frequency changer 15₃ is converted to DC by rotor rectifier 15₂, and magnetic flux is produced by applying this to field winding 15₁. Control of the magnetic flux of synchronous motor 15 is achieved as follows. The output signal of the voltage detector 23, which detects the armature voltage of synchronous motor 15, is compared with the output signal of the D/A converter 18 (speed detection signal) as processed by excitation reference generator 25, to establish a reference for voltage controller 24. The input current of thyristor switch 22 is detected by current detector 24₁ and the required voltage control is thus effected.

Figure 3:
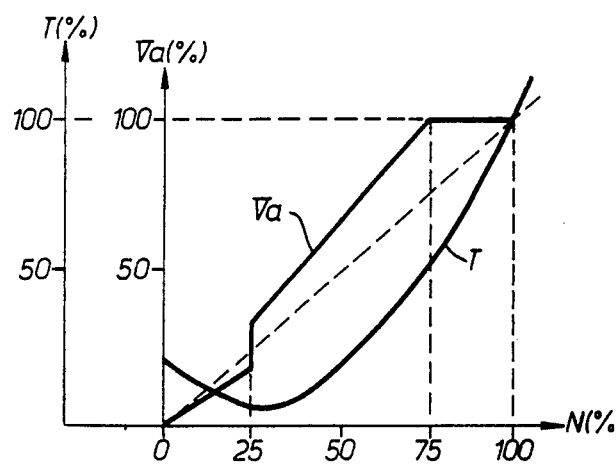
FIG. 3 is a graph of the Va-N and T-N characteristics of the embodiment of FIG. 2.

Excitation reference generator 25, receiving the output signal from D/A converter 18, generates an output signal according to the rotation of synchronous motor 15 as shown in FIG. 3. Voltage controller 24 compares the output voltage of inverter 14, which is detected by voltage detector 23, with the output of excitation reference generator 25, and the difference is applied to thyristor switch 22 to control the field current $I_f$ so that the armature voltage value approaches the desired value for a particular speed as determined by generator 25.

Figure 1:
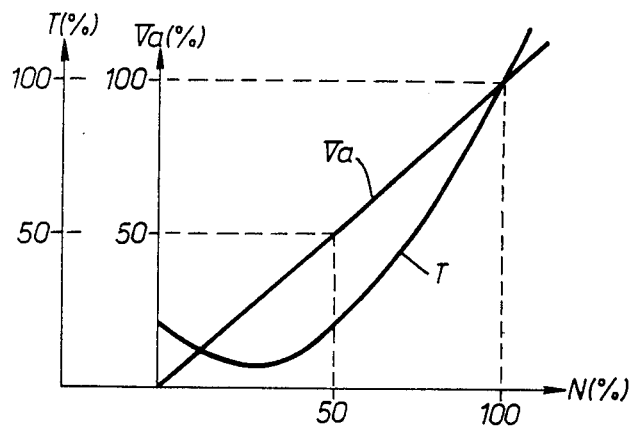
FIG. 1 is a graph of Va-N and T-N characteristics in a conventional system.

The characteristics of the control system are as follows, with reference to FIGS. 3 and 4(a)–4(d). FIG. 3 is a graph of Va-N and T-N characteristics, corresponding to the depiction in FIG. 1 of the characteristics of a conventional system. In FIG. 3, the load torque T changes as a function of the rotation N of the synchronous motor 15 in the same manner as the T-N characteristic in FIG. 2.

The armature voltage Va of the synchronous motor 15 is, however, controlled by field excitation reference generator 25 which adjusts the field current so that Va/N is not constant over the whole range of speeds N. In the example depicted in FIG. 3, the pattern is such that when the speed N is in the range of 0 to 25%, the armature voltage Va is controlled in the low range; when N is in the range 25% to 75%, Va/N is constant and Va is controlled in the high range; and when N is in the range 75% to 100%, Va is controlled to a virtually constant value.

FIGS. 4(a)–4(d) show the characteristics of a drive control system for a synchronous motor controlled in this manner. FIG. 4(a) depicts the armature current Ia of synchronous motor 15; FIG. 4(b), the field current $I_f$ flowing in field winding 15₁; FIG. 4(c), the excitation input power $Pf_1$ and the excitation input voltage $Ef_1$ of the induction frequency changer 15₃; and FIG. 4(d), the input power factor PFα of the rectifier 12. In FIGS. 4(a)–4(d), each solid line depicts the above-mentioned value when the armature voltage Va varies according to FIG. 3 and each dotted line depicts the above-mentioned value when the armature voltage Va varies according to FIG. 1 (hereinafter called "in the conventional controller").

In FIG. 4(a), in this invention, the armature current Ia: (1) is proportional to the speed N cubed when N is in the range of 75% to 100%, (2) is proportional to the load torque T or square of the speed N when N is in the range of 25% to 75% and (3) increases by more than the load torque T when N is in the range 0 to 25%. In the conventional controller, the armature current Ia is proportional to the load torque T or the square of the speed N.

In FIG. 4(b), the field current $I_f$ in this invention is smaller than that of the conventional controller when the speed N is in the range of 0% to 25%. The field current in the former case is, in turn, more than the field current in the latter case when N is in the range of 25% to 75%. In this invention the field current $I_f$ does not vary very much when N is in the range of 75% to 100%. The field current $I_f$ in the conventional controller is proportional to the load torque T and the minimum field current $I_f$ is one-half of that when N is 100%.

In FIG. 4(c), the excitation input power $Pf_1$ is proportional to the load torque T, as is the field current $I_f$, and the minimum excitation input power $Pf_1$ is one-quarter of that when N is 100%. The excitation input voltage $Ef_1$ in the conventional controller is inversely related to the speed N. The excitation input voltage $Ef_1$ in this invention is smaller than that in the conventional controller when N is in the range of 0% to 25%, and the excitation input voltage in this invention is, in turn, greater than that in the conventional controller when N is in the range of 25% to 100%.

In FIG. 4(d), the input power factor PFα of rectifier 12 in both this invention and in the conventional controller is the same as the corresponding armature voltage Va. The input power factor PFα in this invention and that in the conventional controller are roughly the same when N is in the range of 0% to 25%, and the power factor in this invention is better than in the conventional controller when N is in the range of 25% to 75%. With this invention, as explained above, the input power factor PFα of rectifier 12 is increased by 10% to 15% in the typical range of operation (where N is 50% to 80%), while the reactive current taken from input AC source 11 in the typical range of operation is considerably reduced.

Moreover, with regard to the capacity of the excitation power source of induction frequency changer 15₃, since the maximum value of the excitation input voltage $Ef_1$ is lower than in that of conventional control method when N is 0, the capacity of field input source 21 can be reduced, and its power factor increased. The reason why this advantageous effect is obtained is that the invention is applied only to a square-law torque load. Further, even though the armature voltage Va for the N range of 75% to 100% is controlled to a constant value, the load torque T reaches its maximum when N is 100%, and for this reason the armature current Ia and field current $I_f$ do not increase even when N decreases, and there is no need for an increase in the capacity of synchronous motor 15. In the case of a constant torque load, since the magnetic flux of synchronous motor 15 is weakened when N is 75% to 100%, the armature current Ia increases in proportion to N. In the case of constant output power control, when the output power of the synchronous motor 15 is controlled to a constant value, the armature current Ia is at its maximum when N is in the region of 75%. Both the case of constant torque load mentioned above and the case of constant output power control involve an increase in capacity, weight and dimensions of synchronous motor 15, with a consequent increase in cost.

The reason the armature voltage Va in this invention (FIG. 3) can be set lower than in FIG. 2 when N is 0 to 25% is that the load torque is smaller in this range, and the torque generated by synchronous motor 15 can also be reduced. These advantages can only be obtained in the case of square-law torque. As the above explanation will have made clear, the invention was proposed after a thorough study of the characteristics of synchronous motor 15 and of the characteristics of square-law torque loads; and only when it is applied to square-law torque loads can the advantages mentioned above be obtained without an increase in the capacity, weight and cost of synchronous motor 15.

Figure 5:
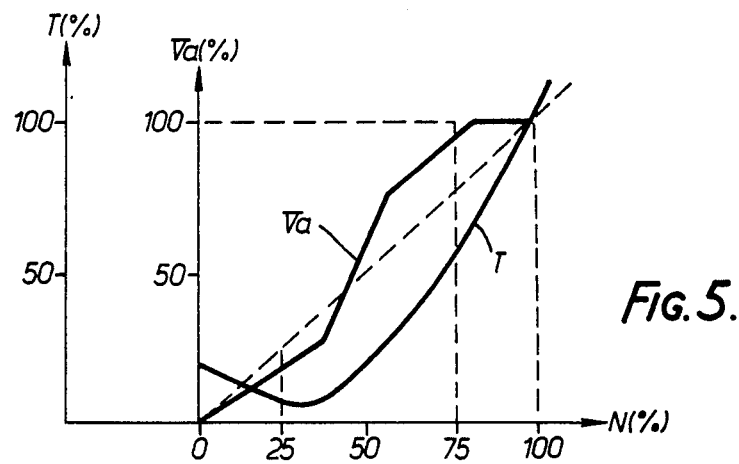
FIGS. 5 and 6 are graphs of the Va-N and T-N characteristics of other embodiments of the invention.

FIG. 5 shows the characteristics of another embodiment of the invention. There is no need to restrict to that shown in FIG. 3 the ranges of speed N where the ratio Va/N is controlled to a lower value than the constant slope straight line and where Va is controlled to a constant value. A pattern such as shown in FIG. 5 can also be set, with any N range being selected at will to match the normal range of synchronous motor 15.

Figure 6:
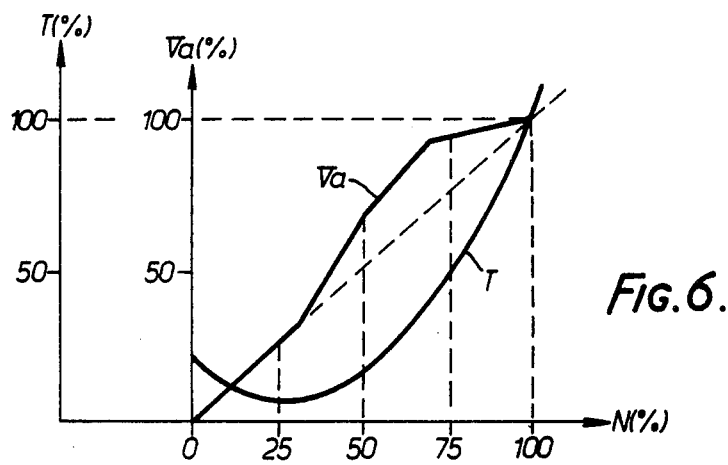

FIG. 6 shows the characteristics of yet another embodiment of the invention. This graph shows a pattern which provides only for a range where the armature voltage Va is greater than the previously-mentioned straight line of constant slope Va/N. It is clear that the effects obtained in the range where the armature voltage Va coincides with the broken line will be unaltered. In the case of FIG. 6, the capacity of field input source 21 is not reduced, but the reactive current taken from input AC source 11 *is* considerably reduced.

As FIGS. 3, 5 and 6 demonstrate, in this invention the ratio of the armature voltage Va to the rotation N is not restricted to one particular value. If the armature voltage Va is set, in the normal working range, to give a Va/N ratio larger than the ratio Va(100)/N(100) of the rated armature voltage Va(100) and the rated rotation N(100) (both values being the 100 percentage points) of synchronous motor 15, or if, in addition to this, the armature voltage is set, in the low speed range, to give a Va/N ratio smaller than Va(100)/N(100), it is clear that the results described above can be obtained.

One possible embodiment of speed controller 17 will now be explained by referring to FIG. 7.

Figure 7:
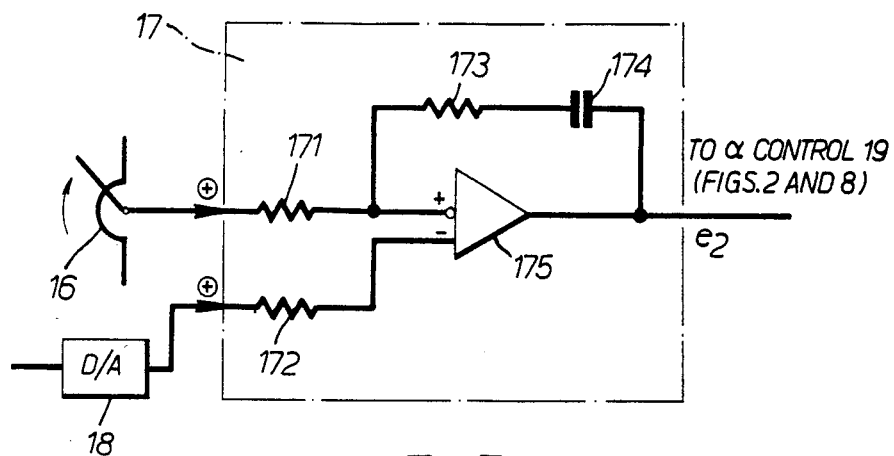
FIGS. 7, 8 and 9 show one form of speed controller, $\alpha$ controller and excitation reference generator, respectively.

In FIG. 7, elements 171 to 173 are resistors; 174 a condensor; and 175 an operational amplifier. The output signal from speed reference input control 16 and the output signal from D/A converter 18 are applied respectively to resistors 171 and 172. The difference between the former and the latter is detected by operational amplifier 175. Thus, the standard output signal $e_2$ of speed controller 17 is supplied to α controller 19.

Figure 8:
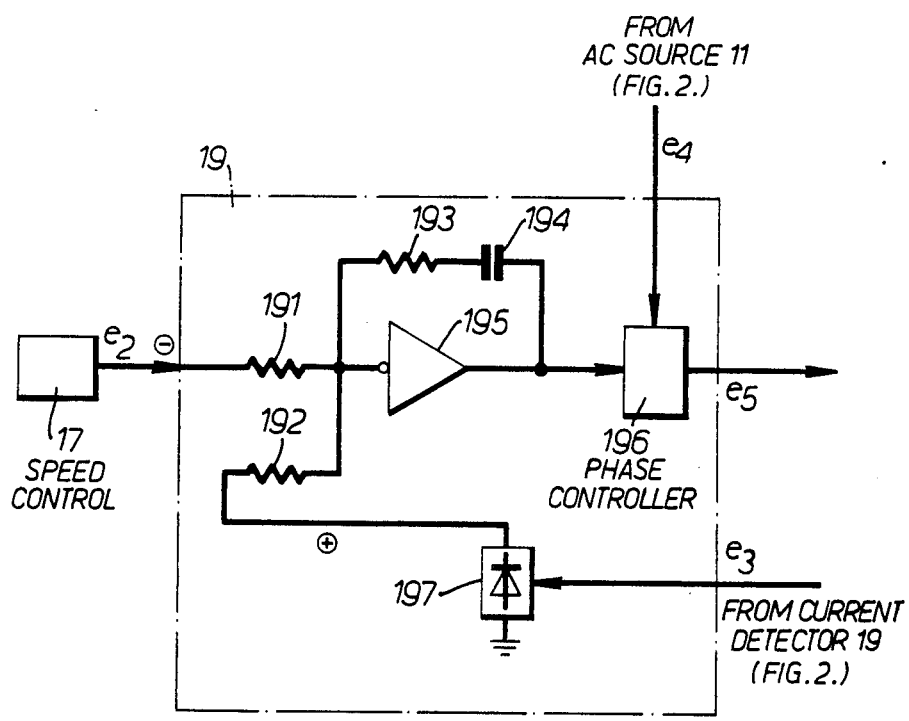

One possible embodiment of α controller 19 will now be explained by referring to FIG. 8. In FIG. 8, elements 191 to 193 are resistors; 194 a condensor; 195 an operational amplifier; 196 a phase controller; and 197 a rectifier. α controller 19 controls the output of rectifier 12, so that the value of the output current corresponds with that of the standard output signal $e_2$ in FIG. 7. The detected signal $e_3$ of the current detector $19_1$ is applied to rectifier 197 in order to convert it into DC. On the other hand, the standard output signal $e_2$ of speed controller 17 is supplied to resistor 191. The phase signal from operational amplifier 195 is supplied to phase controller 196 after the comparison between $e_2$ and $e_3$.

The phase signal of the input AC source 11 is supplied to phase controller 196 through $e_4$. The output signal $e_5$ of the phase controller 196 controls the ignition timing of rectifier 12 after the comparison by phase controller 196.

Controller 20 in FIG. 2 and phase controller 196 in FIG. 8 are well known, commonly used circuits. Examples of perfectly acceptable circuits may be found in *The Theory and Operation of Thyristor Motors* by Kamiyama, published by Denki Shoin in Japan in 1974.

Voltage detector 23 in FIG. 2 simply monitors the AC armature voltage applied to motor 15 and employs a rectifier to produce a DC voltage related thereto.

Voltage controller 24 in FIG. 2 performs the same function for thyristor switch 22 as α controller 19 performs for rectifier 12. Therefore voltage controller 24 may be similar to the example of α controller 19 illustrated in FIG. 8.

Figure 9:
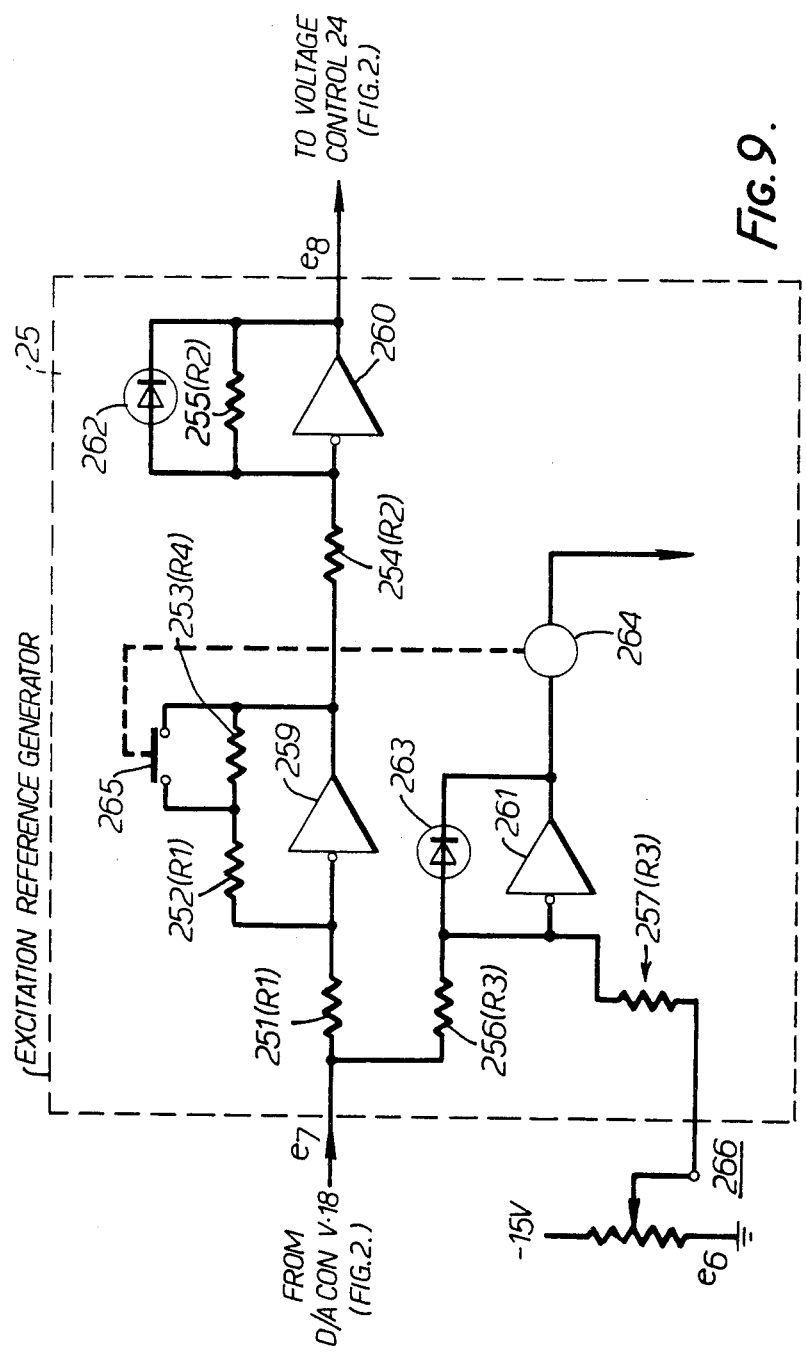

One possible embodiment of excitation reference generator 25 will now be explained by referring to FIG. 9. In FIG. 9, elements 251 to 257 are resistors; 258 a variable resistor; 259 to 261 operational amplifiers; 262 and 263 diodes; 264 a relay; and 256 a switch depending upon relay 264. $R_1$ represents a resistive value of resistors 251, 252, $R_2$ a resistive value of resistors 254, 255, $R_3$ a resistive value of resistors 256, 257, $R_4$ a resistive value of a resistor 253. When the lever of the variable resistor 258 is clockwise rotated, a voltage $e_6$ on a point 266 is shifted from a 0 to a negative voltage.

When input signal $e_7$ from D/A converter 18 varies from 0 V to +10 V and a voltage $e_6$ on a point 266 is 2.5 V, the relation between speed N of synchronous motor 15 and the armature voltage Va is as follows. When speed N is from 0% to 25% of the rated value, the value of input voltage $e_7$ is smaller than that of voltage $e_6$ on a point 266 and consequently an output signal is produced by operational amplifier 261. This causes relay 264 to be on and switch 265 to be closed. Consequently, resistor 253 is short-circuited. As a result, since resistors 251 and 252 have the same value, the value of the output voltage $e_8$ is equal to that of the input voltage $e_7$. Furthermore, when speed N is over 25% of the rated rotation, the value of input voltage $e_7$ is bigger than that of the voltage $e_6$ on point 266 and consequently an output signal is not produced by operational amplifier 261. This causes relay 264 to be off and switch 265 to be opened. Consequently, resistors 252 and 253 are series connection between the output and input of operational amplifier 259. Thus, the value of the output voltage $e_8$ is greater than that of the input voltage $e_7$.

If the value of $(R_1+R_4)/R_1$ is equal to 4/3, as it is in the embodiment in FIG. 9, when speed N is 75% of the rated rotation, the value of the output voltage $e_8$ is equal to 10 V. When speed N increases over 75% of the rated rotation, the value of the output voltage $e_8$ remains equal to 10 V as a result of diode 262.

Therefore, the output voltage $e_8$ from excitation reference generator 25 in FIG. 9 is as shown in FIG. 3.

A DC type thyristor motor system is shown in FIG. 2 as the frequency changer for variable operation of synchronous motor 15. However, clearly a cycloconverter or forced commutation type inverter system can also be used, and there is no particular restriction as to the implementation of the frequency changer.

Various other portions of the circuit may also have different constructions, provided the substance of the invention is not altered.

With this invention, as explained above, the power factor of the input AC source of a synchronous motor drive control system can be improved, and the reactive current input can be reduced. This makes possible a reduction in the capacity of the power factor correction apparatus which is needed on the input AC source side of the system, and a reduction is also achieved in the apparent power drawn from the input AC source. The result is an increase in the operating efficiency of the system, and a reduction in the size and cost of the equipment.

What is claimed is:

1. A method of controlling a synchronous motor driving a square-law torque load by means of a frequency changer which can vary its output voltage and output frequency, said method comprising the steps of:
monitoring the speed N of said synchronous motor;
generating a reference armature voltage Va related to the speed of said motor, a ratio of said reference voltage Va and said speed N being smaller than Va(100)/N(100), where said N(100) is the rated motor speed and said Va(100) is the armature voltage of said motor at a speed of said N(100), for all motor speeds below a predetermined value to reduce the necessary capacity of a field AC power source for said motor and said ratio being larger than Va(100)/N(100) for all motor speeds above said predetermined value to improve the power factor of said motor at speeds above said predetermined value;
controlling the armature voltage of said motor to said reference voltage.

2. A method in accordance with claim 1, wherein said predetermined value is approximately 25% of said N(100).

3. A method in accordance with claim 1, wherein in a range of motor speed more than a second predetermined value larger than said predetermined value, a slope of the relationship of said Va to said N is smaller than said slope for motor speeds between said predetermined value and said second predetermined value.

4. A method in accordance with claim 3, wherein said slope is 0 for motor speeds higher than said second predetermined value.

5. A method in accordance with claim 3, wherein said predetermined value is approximately 25% of said N(100) and said second predetermined value is approximately 75% of said N(100).

6. A method in accordance with claim 5, wherein said slope is 0 for motor speeds higher than said second predetermined value.

7. A method in accordance with claim 3, wherein, in a range of motor speeds beyond a third predetermined value larger than said second predetermined value, said slope of the relation of said Va to said N is smaller than said slope between said second predetermined value and said third predetermined value.

8. A method in accordance with claim 7, wherein said slope is 0 for motor speeds beyond said third predetermined value.

9. A method of controlling a synchronous motor driving a square-law torque load by means of a frequency changer which can vary its output voltage and output frequency, said method comprising the steps of:
monitoring the speed N of said synchronous motor;
generating a reference armature voltage Va related to the speed of said motor, a ratio of said reference voltage Va and said speed N being smaller than Va(100)/N(100) for all motor speeds lower than a first predetermined value to reduce the necessary capacity of a field AC power source for said motor, and said ratio being larger than Va(100)/N(100) for all motor speeds above a second predetermined value larger than said first predetermined value to improve the power factor of said motor at speeds above said predetermined value, where said N(100) is the rated motor speed and said Va(100) is the armature voltage of said motor at a speed of said N(100);
controlling the armature voltage of said motor to said reference voltage.

10. A method in accordance with claim 9, wherein both said first predetermined value and said second predetermined value are approximately 25% of said N(100).

11. A method in accordance with claim 9, wherein, in a range of motor speeds more than a third predetermined value larger than said second predetermined value, said slope of the relationship of said Va with said N is smaller than said slope between said second predetermined value and said third predetermined value.

12. A method in accordance with claim 11, wherein said slope is 0 for motor speeds beyond said third predetermined value.

13. A method in accordance with claim 12, wherein said third predetermined value is approximately 75% of the said N(100).

14. Apparatus for controlling a synchronous motor driving a square-law torque load, by means of a frequency changer which can vary its output voltage and output frequency, said apparatus comprising:
means for detecting the speed N of said motor;
means for generating a reference voltage Va related to the output of said detecting means, a ratio of said reference voltage Va and said speed N being smaller than Va(100)/N(100), where N(100) is the rated motor speed and said Va(100) is the armature voltage of said motor at a speed of said N(100), for all motor speeds below a predetermined value to reduce the necessary capacity of a field AC power source for said motor and said ratio being larger than Va(100)/N(100) for all motor speeds above said predetermined value to improve the power factor of said motor at speeds above said predetermined value; and
means for controlling the armature voltage of said motor to said reference voltage.

15. Apparatus as in claim 14, wherein said generating means causes said ratio to be above said Va(100)/N(100) for motor speeds above approximately 25% of said N(100).

16. Apparatus as in claim 14, wherein said generating means causes the slope of the variation of said Va with said N for motor speeds greater than a second predetermined value to be smaller than said slope for motor speeds between said predetermined value and said second predetermined value, said second predetermined value being greater than said predetermined value.

17. Apparatus as in claim 16, wherein said generating means causes said slope to be smaller for motor speeds beyond a third predetermined value than said slope between said second predetermined value and said third predetermined value, said third predetermined value being larger than said second predetermined value.

18. Apparatus as in claim 14, wherein said controlling means comprises:
means for monitoring the actual armature voltage of said motor;
means for comparing said actual armature voltage with said reference armature voltage Va and producing an error signal related thereto; and
means, responsive to said error signal, for controlling the field current of said motor so that said actual armature voltage approaches said reference armature voltage Va.

19. Apparatus as in claim 18, wherein said field current controlling means comprises:
- a current source;
- thyristor switching means for controlling the current flowing from said current source to said motor; and
- means for controlling said thyristor switch means in response to said error signal.

20. Apparatus for controlling a synchronous motor driving a square-law torque load, by means of a frequency changer which can vary its output voltage and output frequency, said apparatus comprising:
- means for detecting the speed N of said motor;
- means for generating a reference armature voltage Va related to the speed of said motor, a ratio of said reference voltage Va and said speed N being smaller than Va(100)/N(100), for all motor speeds lower than first predetermined value to reduce the necessary capacity of a field AC power source for said motor, and said ratio being larger than Va(100)/N(100) for all motor speeds above a second predetermined value no smaller than said first predetermined value to improve the power factor of said motor at speeds above said predetermined value, where said N(100) is the rated speed of said motor and Va(100) is the armature voltage of said motor at a speed of said N(100); and
- means for controlling said armature voltage of said motor to said reference voltage.

* * * * *